United States Patent
Fay

(10) Patent No.: US 9,223,942 B2
(45) Date of Patent: Dec. 29, 2015

(54) AUTOMATICALLY PRESENTING RIGHTS PROTECTED CONTENT ON PREVIOUSLY UNAUTHORIZED DEVICE

(71) Applicant: SONY CORPORATION, Tokyo (JP)

(72) Inventor: Luke Vernor Fay, San Diego, CA (US)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 14/068,533

(22) Filed: Oct. 31, 2013

(65) Prior Publication Data

US 2015/0121541 A1    Apr. 30, 2015

(51) Int. Cl.
| | |
|---|---|
| *G06F 7/04* | (2006.01) |
| *G06F 17/30* | (2006.01) |
| *H04N 7/16* | (2011.01) |
| *G06F 21/10* | (2013.01) |
| *G06F 21/12* | (2013.01) |
| *H04N 21/4627* | (2011.01) |

(52) U.S. Cl.
CPC .............. *G06F 21/10* (2013.01); *G06F 21/123* (2013.01); *H04N 21/4627* (2013.01)

(58) Field of Classification Search
CPC .................. G06F 21/10; G06F 21/123; G06F 2221/2111; H04N 21/4627; H04N 21/40; H04N 21/8355; H04L 9/3273; H04L 63/067; H04L 63/068
USPC ..................................................... 726/26–33
See application file for complete search history.

(56) References Cited

U.S. PATENT DOCUMENTS

| | | | |
|---|---|---|---|
| 7,196,807 | B2 | 3/2007 | Goldstone |
| 7,487,363 | B2 | 2/2009 | Alve et al. |
| 7,707,114 | B2 | 4/2010 | Tuoriniemi |
| 7,844,821 | B2 | 11/2010 | Alve et al. |
| 8,341,402 | B2 | 12/2012 | Han et al. |
| 8,385,545 | B2 | 2/2013 | Pinder |
| 8,410,898 | B1 | 4/2013 | Vasquez |
| 8,516,255 | B2 | 8/2013 | Roberts et al. |
| 8,549,304 | B2 | 10/2013 | Alve et al. |
| 2001/0034843 | A1* | 10/2001 | Hess .............................. 713/201 |
| 2003/0076955 | A1 | 4/2003 | Alve et al. |
| 2003/0142364 | A1 | 7/2003 | Goldstone |
| 2004/0083487 | A1 | 4/2004 | Collens et al. |
| 2004/0088175 | A1* | 5/2004 | Messerges et al. ............... 705/1 |

(Continued)

FOREIGN PATENT DOCUMENTS

WO    0018054    3/2000

*Primary Examiner* — Mohammad W Reza
*Assistant Examiner* — Amie C Lin
(74) *Attorney, Agent, or Firm* — John L. Rogitz

(57) ABSTRACT

A first consumer electronics device includes a computer readable storage medium bearing instructions executable by a processor, and a processor configured for accessing the computer readable storage medium to execute the instructions to configure the processor for receiving a signal indicative of close proximity of the first CE device to a second CE device. The instructions also configure the processor for providing a private key to the second CE device in response to receiving the signal. The private key is associated with a digital rights management (DRM) account for which the first CE device has been configured to access, and is configured for a single use by the second CE device to access a first audio video (AV) content without the second CE device communicating any other authentication information associated with the DRM account to access the first AV content to a content provider associated with the first AV content.

13 Claims, 7 Drawing Sheets

(56) References Cited

U.S. PATENT DOCUMENTS

| | | |
|---|---|---|
| 2004/0107356 A1* | 6/2004 | Shamoon et al. ............ 713/193 |
| 2004/0117818 A1* | 6/2004 | Karaoguz et al. ............... 725/31 |
| 2004/0151309 A1 | 8/2004 | Gentry et al. |
| 2004/0187001 A1 | 9/2004 | Bousis |
| 2005/0044016 A1* | 2/2005 | Irwin et al. .................... 705/30 |
| 2005/0268098 A1* | 12/2005 | Oh et al. ....................... 713/168 |
| 2006/0047976 A1 | 3/2006 | Moroney et al. |
| 2006/0149676 A1 | 7/2006 | Sprunk et al. |
| 2006/0179478 A1 | 8/2006 | Han et al. |
| 2006/0259927 A1* | 11/2006 | Acharya et al. ................ 725/61 |
| 2007/0033414 A1* | 2/2007 | Dunko .......................... 713/186 |
| 2007/0168293 A1 | 7/2007 | Medvinsky |
| 2007/0220610 A1 | 9/2007 | Van Loenen et al. |
| 2007/0300252 A1* | 12/2007 | Acharya et al. ................ 725/25 |
| 2008/0120241 A1* | 5/2008 | Kim ................................ 705/59 |
| 2008/0177822 A1* | 7/2008 | Yoneda ......................... 709/202 |
| 2008/0178284 A1* | 7/2008 | Harwell .......................... 726/21 |
| 2008/0267398 A1 | 10/2008 | Peterka et al. |
| 2008/0294908 A1 | 11/2008 | Yamaguchi et al. |
| 2008/0313741 A1 | 12/2008 | Alve et al. |
| 2009/0028327 A1 | 1/2009 | Pinder |
| 2009/0037748 A1* | 2/2009 | Kim et al. ..................... 713/193 |
| 2009/0182670 A1* | 7/2009 | Farrugia et al. ................ 705/51 |
| 2009/0210915 A1* | 8/2009 | Millman et al. ................ 725/92 |
| 2009/0274305 A1 | 11/2009 | Lee et al. |
| 2010/0174608 A1* | 7/2010 | Harkness et al. .......... 705/14.53 |
| 2010/0299762 A1* | 11/2010 | Jouret et al. .................... 726/28 |
| 2011/0040975 A1 | 2/2011 | Alve et al. |
| 2011/0066886 A1* | 3/2011 | Sugiura et al. ................. 714/16 |
| 2012/0066134 A1* | 3/2012 | Washiro ......................... 705/59 |
| 2012/0208455 A1* | 8/2012 | Hill .............................. 455/41.1 |
| 2012/0226542 A1* | 9/2012 | Blosser et al. ............. 705/14.25 |
| 2013/0174223 A1* | 7/2013 | Dykeman et al. ................ 726/4 |
| 2015/0072663 A1* | 3/2015 | Chande et al. ............. 455/414.1 |

* cited by examiner

AUTOMATICALLY PRESENTING RIGHTS PROTECTED CONTENT ON PREVIOUSLY UNAUTHORIZED DEVICE

I. FIELD OF THE INVENTION

The present application relates generally to presenting rights-protected content on a consumer electronics (CE) device.

II. BACKGROUND OF THE INVENTION

This is a background discussion only in which nothing is to be construed as admitted prior art.

Rights management of content such as audio video (AV) content has become important in today's computerized environments to prevent unauthorized presentation of proprietary content on devices and/or by individuals who have not received authorization to present the content from the content's provider(s) and/or copyright holder(s). However, as recognized herein, should an individual with authorization to present a piece of content wish to present the content the individual is authorized to view on a device that is not associated with the individual (e.g., a foreign device not owned by the individual, such as a friend's device, a device to which the individual temporarily has access but does not own, etc.), the user is often required to enter authorization information to the foreign device to access the proprietary content, thereby ensuring that the person entering the information has been authorized to view the proprietary content but at the expense of being a cumbersome process to the person. One example of such authorization information is content subscription service login information.

Moreover, if such authorization information is then stored on the device to which it was entered, subsequent unauthorized access to the content or even the user's subscription service itself may be permitted once the user is no longer in control of the device. Even further, if the device may be associated with another individual having their own subscription to the same service, the subscription information, login information, authentication information, etc. must later be changed back for other individual, which may also be cumbersome.

SUMMARY OF THE INVENTION

Accordingly, present principles recognize that it is desirable to provide systems, devices, and methods for automatically and/or seamlessly (e.g. relative to a user) presenting content that is owned by or authorized for use by a first individual on a friend's device without having to enter the first individual's rights management information into the friend's device to present content that the friend and/or friend's device has not been authorized to present. Such "friend" devices—e.g. devices that are not always and everywhere associated with the first individual (e.g., not owned by the individual) to whom access to proprietary content has been granted but to which the first individual may otherwise be required to enter authorization information temporarily to view the proprietary content thereon if not for present principles—are colloquially referred to herein as "unauthorized" devices even though such "unauthorized" devices are "authorized" to the extent they are enabled to present such content e.g. a single time within a time threshold as described below.

In any case, in one aspect a first consumer electronics (CE) device includes at least one computer readable storage medium bearing instructions executable by a processor, and at least one processor configured for accessing the computer readable storage medium to execute the instructions. The instructions configure the processor for receiving a signal indicative of physical contact of the first CE device with a second CE device, and providing a private key to the second CE device in response to receiving the signal. The private key is associated with a digital rights management (DRM) account for which the first CE device has been configured to access. The private key is also configured for a single use by the second CE device to access at the second CE device a first audio video (AV) content without the second CE device communicating any other authentication information associated with the DRM account to access the first AV content to a content provider associated with the first AV content.

If desired, the instructions may also configure the processor for providing, to the second CE device, location information for a first location at which the first AV content is stored. The first location of the first AV content may be at a server associated with the content provider, and the first location may be configured for providing the first AV content only once from the first location to any one device. Even further, the server for which the location information is provided may be configured to delete the first AV content from the first location after being provided to any device. Also if desired, the first AV content may be stored at a second location accessible to the first CE device using the DRM account.

Furthermore, in some embodiments the instructions may configure the processor for providing the first AV content itself to the second CE device. The first AV content may be subject to at least one DRM protocol established by the content provider, and thus the first AV content provided to the second CE device may be configured for presentation on the second CE device in response to the second CE device providing the private key to the content provider and receiving back from the content provider authorization to present the first AV content on the second CE device in accordance with the DRM protocol.

In addition, the private key may provide access to the first AV content at the second CE device for only a predetermined amount of time from when the private key is provided to the second CE device. In addition to or in lieu of the private key providing access to the first AV content at the second CE device for only a predetermined amount of time from when the private key is provided to the second CE device, the private key may provide access to the first AV content at the second CE device for only a predetermined amount of time from when presentation of the first AV content is initiated at the second CE device.

What's more, in some embodiments the private key may be provided to the second CE device only upon authentication of a user of the first CE device at the first CE device as a person associated with the DRM account and authorized by the content provider to access the AV content, where the authentication is in part executed based on facial recognition of the user and/or fingerprint recognition of the user Even further, if desired the signal indicative of physical contact of the first CE device with the second CE device may be a close proximity wireless transfer technology signal generated in response to the first and second CE devices physically contacting each other. In example embodiments, this close proximity wireless transfer technology may be TransferJet. Moreover, the instructions may configure the processor for providing the private key to the second CE device while the first and second CE devices are in physical contact with each other and communicating using the close proximity wireless transfer technology.

In another aspect, a computer readable storage medium that is not a carrier wave bears instructions which when executed by a processor of a first consumer electronics (CE) device configures the processor to execute logic including receiving single-access content rights information, where the content rights information is useful only once with a content provider for accessing a piece of content from the content provider. The piece of content is otherwise subject to at least one rights protocol preventing presentation of the piece of content on a device except upon successful authentication by the content provider of login information entered at the device. The login information pertains to an account permitting access to the piece of content through the content provider. In addition to the foregoing, the instructions configure the processor for providing the single-access content rights information to the content provider, and presenting the piece of content on the first CE device in response to receiving back from the content provider a communication indicating the first CE device is permitted to present the piece of content a single time.

In still another aspect, a method includes receiving an audio video (AV) content access key at a consumer electronics (CE) device, providing the AV content access key to a content provider, receiving from the content provider authorization information for presenting AV content associated with the AV content access key on the CE device, accessing the AV content using the authorization information, and presenting on the CE device the AV content within a threshold time from receiving the AV content access key. The threshold time is established by the content provider and indicated in the authorization information. The method then includes presenting a prompt to a user of the CE device after presenting the AV content on the CE device indicating that the AV content is available for purchase from the content provider.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
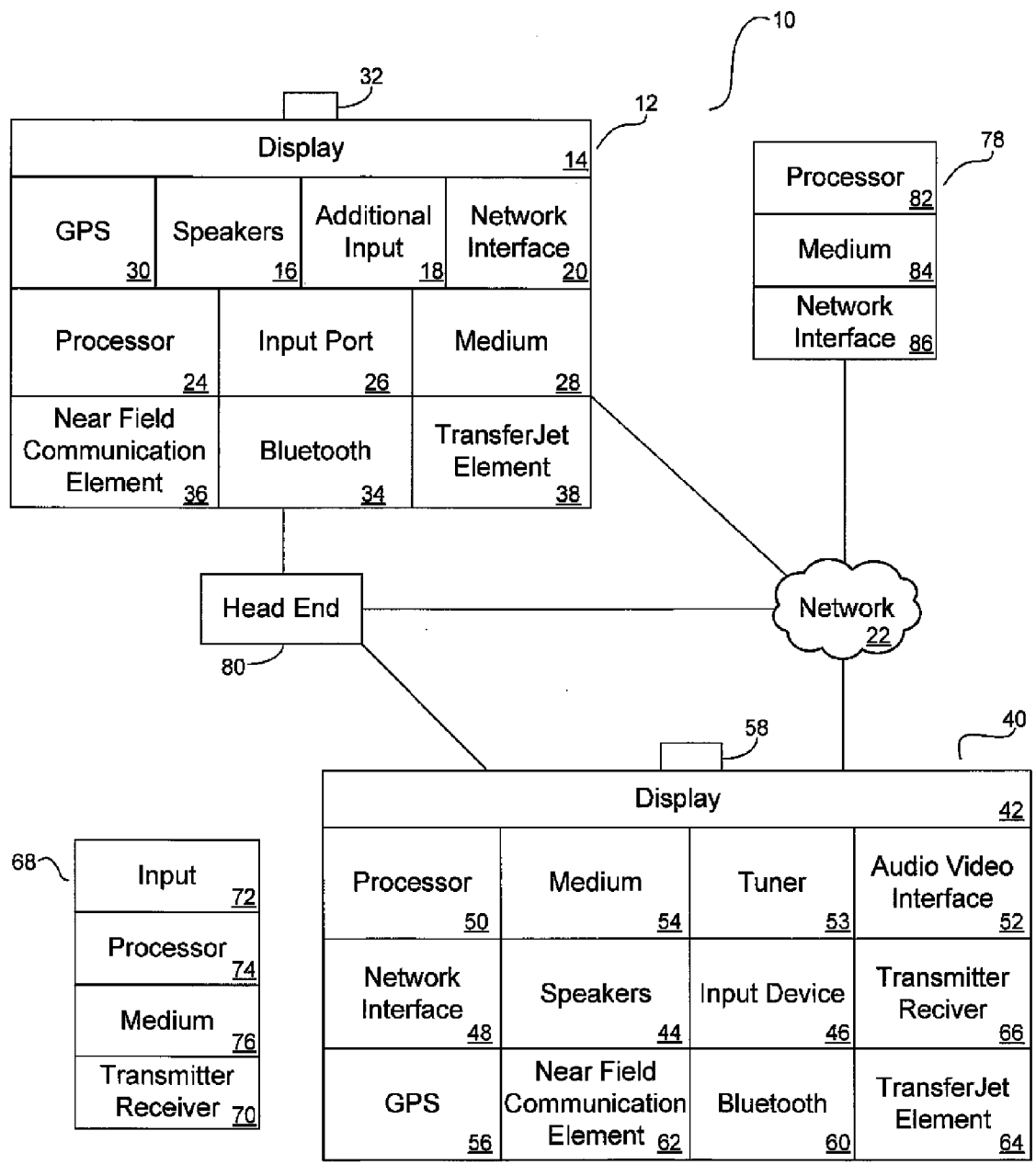
FIG. 1 is a block diagram of an example system including two example CE devices in accordance with present principles.

This disclosure relates generally to consumer electronics (CE) device based user information. With respect to any computer systems discussed herein, a system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software modules described by way of flow charts and/or user interfaces herein can include various sub-routines, procedures, etc. It is to be understood that logic divulged as being executed by a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

In an example, a processor can access information over its input lines from data storage, such as the computer readable storage medium, and/or the processor accesses information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the CE device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below to present rights protected content in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other CE devices to undertake present principles, execute the logic described herein, and perform any other functions and/or operations described herein).

Accordingly, to undertake such principles the CE device 12 can include some or all of the components shown in FIG. 1. For example, the CE device 12 can include one or more touch-enabled displays 14 (e.g. configured to receive input such touch-input and fingerprint data of a user), one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images/content thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage mediums 28 such as disk-based or solid state storage, it being understood that the computer readable storage medium 28 may not be a carrier wave. Also in some embodiments, the CE device 12 can include a position or location receiver such as but not limited to a GPS receiver 30 that is configured to e.g. receive geographic position information from at least one satellite and provide the information to the processor 24. However, it is to be understood that that another suitable position receiver other than a GPS receiver may be used in accordance with present principles to e.g. determine the location of the CE device 12.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles (e.g. to gather an image of a user of the CE device for facial recognition purposes). Also included on the CE device 12 may be a Bluetooth transceiver 34 for communication with other devices using Bluetooth technology, a Near Field Communication (NFC) element 36 for communication with other devices using NFC technology, and a TransferJet element 38 for communication with other devices using TransferJet technology. Further, note that an example NFC element can be a radio frequency identification (RFID) element, and also note that while a TransferJet element is shown, it is to be understood that other forms of close-proximity communication technologies that enable communication between devices when the devices are e.g. in physical contact with each other may be used in accordance with present principles.

Still referring to FIG. 1, in addition to the CE device 12, the system 10 may further include another CE device 40 that in exemplary embodiments may be a television (TV) such as e.g. a high definition TV and/or Internet-enabled computerized TV (e.g. a "smart" TV). However, present principles recognize that the CE device 40 may be e.g. any of the other devices described herein. Regardless, it is to be understood that the CE device 40 is configured to undertake present principles (e.g. to present rights protected content in accordance with present principles). The CE device 40 includes one or more touch-enabled displays 42, one or more speakers 44 for outputting audio in accordance with present principles, and at least one additional input device 46 such as e.g. an audio receiver/microphone for e.g. entering audible commands to the CE device 40 to control the CE device 40.

The example CE device 40 may also include one or more network interfaces 48 for communication the network 22 under control of one or more processors 50. It is to be understood that the processor 50 controls the CE device 40 to undertake present principles, including the other elements of the CE device 40 described herein such as e.g. controlling the display 42 to present images/content thereon and receiving input. Furthermore, note the network interface 48 may be, e.g., a wired or wireless modem or router, or other appropriate interface such as, e.g., a wireless telephony transceiver, Wi-Fi transceiver, etc.

In addition to the foregoing, the CE device 40 may also include e.g. an audio video (AV) interface 52 such as, e.g., a USB or HDMI port for receiving input (e.g. AV content) from a component device such as e.g. a set top box or Blue Ray disc player for presentation of the content on the CE device 40, as well as a tuner 53 also configured for receiving input. The CE device 12 may further include one or more tangible computer readable storage mediums 54 such as disk-based or solid state storage, it being understood that the computer readable storage medium 54 may not be a carrier wave. Also in some embodiments, the CE device 40 can include a position or location receiver such as but not limited to a GPS receiver 56 that is configured to e.g. receive geographic position information from at least one satellite and provide the information to the processor 50. However, it is to be understood that another suitable position receiver other than a GPS receiver may be used in accordance with present principles to e.g. determine the location of the CE device 40.

Continuing the description of the CE device 40, in some embodiments the CE device 40 may include one or more cameras 58 that may be, e.g., a thermal imaging camera, a digital camera such as a webcam, and/or a camera integrated into the CE device 40 and controllable by the processor 50 to gather pictures/images and/or video in accordance with present principles (e.g. to gather an image of a user of the CE device for facial recognition purposes). Also included on the CE device 40 may be a Bluetooth transceiver 60 for communication with other devices using Bluetooth technology, a Near Field Communication (NFC) element 62 for communication with other devices using NFC technology, and a TransferJet element 64 for communication with other devices using TransferJet technology. Further, note that an example NFC element can be a radio frequency identification (RFID) element, and also note that while a TransferJet element is shown, it is to be understood that other forms of close-proximity communication technologies that enable communication between devices when the devices are e.g. in physical contact with each other may be used in accordance with present principles.

In addition to the foregoing, the CE device 40 may also include a transmitter/receiver 66 for communicating with a remote commander (RC) 68 associated with the CE device 40 and configured to provide input (e.g., commands) to the CE device 40 (e.g. to the processor 50) to thus control the CE device 40. Accordingly, the RC 68 also has a transmitter/receiver 70 for communicating with the CE device 40 through the transmitter/receiver 66. The RC 68 also includes an input device 72 such as a keypad or touch screen display, as well as a processor 74 for controlling the RC 68 and a tangible computer readable storage medium 76 such as disk-based or solid state storage. Though not shown, in some embodiments the RC 68 may also include a touch-enabled display screen and a microphone that may be used for providing input/commands to the CE device 40 in accordance with present principles.

Still describing FIG. 1, it also shows at least one server 78 configured for communication with the CE devices 12, 40, and also a cable head end 80 to be described shortly. The server 78 includes at least one processor 82, at least one tangible computer readable storage medium 84 that may not be a carrier wave such as disk-based or solid state storage, and at least one network interface 86 that, under control of the processor 82, allows for communication with the other CE devices of FIG. 1 over the network 22, and indeed may facilitate communication therebetween in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 78 may be an Internet server, and may facilitate authentication, authorization, login by a user, etc. to present rights protected content on one of the CE devices 12, 40 in accordance with present principles. Note that in example embodiments the server 78 may include and perform "cloud" functions such that the CE devices 12, 40 of the system 10 may access a "cloud" environment (e.g., where the user's content may be stored) via the server 78 to e.g. stream proprietary music to which to listen and/or stream or download AV content to present on the CE device.

Now in reference to the afore-mentioned head end 80, it is to be understood that in example embodiments the head end 80 may be e.g. a cable head end and/or a satellite head end. The head end 80 is understood to be in communication with the CE devices 12, 40 and/or the server 78 over, e.g., a closed network (through a wired or wireless connection), and furthermore may itself include a network interface (not shown) such that the head end 80 may communicate with the CE devices 12, 40 and/or server 78 over a wide-area and/or open network such as the network 22. Further still, it is to be understood that the head end 80 may be wired or wirelessly connected to a non-interne server, and/or may optionally be integrated with a non-internet server or the server 78. In any case, it is to be understood that the head end 80 may facilitate the transmission of (e.g. rights protection) information and AV content to the CE devices 12, 40 in accordance with present principles.

Figure 2:
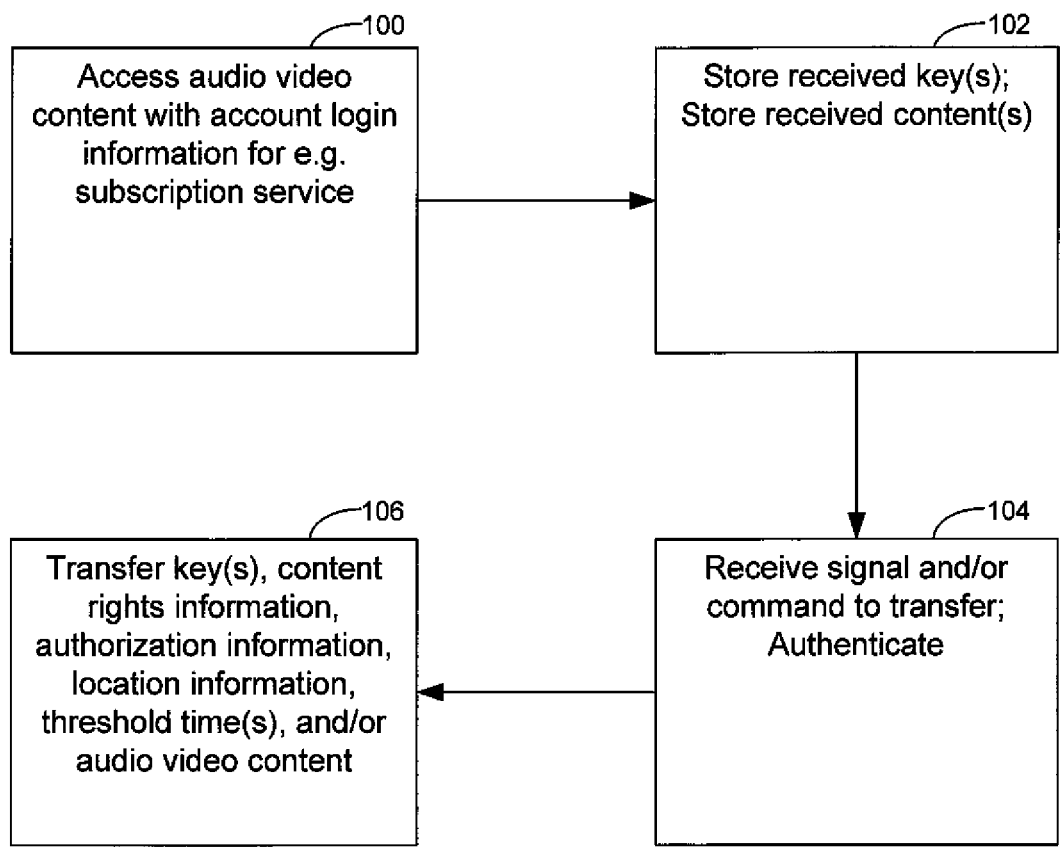
FIGS. 2 and 3 are exemplary flowcharts of logic to be executed by a CE device in accordance with present principles.

Before moving on to FIG. 2, it is to be understood that other CE devices described herein may each respectively include some or all of the various components described above in reference to the CE devices 12, 40 even if not specifically shown or described. Also note that all of the devices described in reference to FIG. 1 may communicate with each other over the network 22 using a respective network interface included thereon, and may each also include a computer readable storage medium that may not be a carrier wave for storing logic and/or software code executable by respective processors of the CE devices in accordance with present principles.

Turning now to FIG. 2, an example flowchart of logic to be executed by a first CE device such as the CE device 12 for enabling a second CE device to present (e.g. proprietary and/or DRM-protected) content to which the first CE device has access in accordance with present principles is shown. Beginning at block 100, the logic accesses content such as AV content with the appropriate content rights and/or access information such as e.g. login information for an AV content subscription service (e.g. a Netflix login, an iTunes login, etc.). The logic then proceeds to block 102 where the logic receives and stores one or more keys (e.g. private encryption keys) respectively associated with one or more contents that are also accessed, received, and/or stored at block 102. These keys may be configured by the content provider to e.g. be self-expiring keys that expire after a predetermined amount of time from their subsequent use by another device as described below, and/or may be configured as keys that are only usable a single time before expiring.

Regardless, after block 102 the logic proceeds to block 104 where the logic receives a signal indicative of close proximity communication of the first CE device executing the logic of FIG. 2 being established with a second CE device using a close proximity communication protocol and/or technology such as e.g. a physical contact data exchange technology (e.g., TransferJet), NFC communication, Bluetooth communication, Wi-Fi communication, etc. Note that at block 104 a command may also be received to initiate the transfer of keys and content, as will be described further below in reference to e.g. FIG. 6.

Still in reference to block 104, further note that in some embodiments in addition to or in lieu of close proximity communication but to nonetheless undertake present principles, the CE device undertaking the logic of FIG. 2 may join a (e.g. host) network such as e.g. a local area network (LAN) to which the second CE device is connected such as a home network in which the second CE device and the user of the second CE device are often disposed.

Furthermore, at block 104 in some example implementations the first CE device may also authenticate that a user manipulating the first CE device (e.g., the user providing the command described above and/or at least in part causing physical contact of the first CE device with the second CE device as described herein) may be authenticated by the first CE device as a user authorized to share rights-protected content (e.g. by providing a key as described herein) on the first CE device and/or accessible to the first CE device. For example, if the first CE device has previously received and stored login information for a content provider's content subscription service (e.g., Netflix) so that the subscription service (and hence e.g. AV content from the service) is accessible to the first CE device using a mobile application on the first CE device, but the account is associated with a particular user of the CE device (e.g. the account for the subscription service is for that user specifically such that that user is the only one authorized to access the service for content viewing), then the first CE device (and/or content provider) may authenticate the user (e.g. using a fingerprint sensor, facial recognition, voice recognition, other biometric-based recognition, etc.) as the one who is indeed authorized to access the account and/or provide a key to another device in accordance with present principles. Thus, the first CE device (e.g. and/or content provider communicating with the first CE device) may in some embodiments confirm that the user seeking to present content on the second CE device is a user authorized to do so based on content rights protections associated with the content itself (and e.g. linked to the account through which the content is provided) and not some one else controlling the first CE device but not "owning" the rights to view and/or present the content (e.g. an unauthorized user).

Notwithstanding the foregoing, the user of the first CE device authorized by the content provider to access the rights-protected content may in some embodiments designate at the first CE device e.g. a proxy person also authorized to access content on the first CE device, provide a key to the second CE device, etc. in accordance with present principles, and that proxy may be similarly authenticated (e.g., using facial recognition).

Accordingly, such authentication (e.g., automatically taking a picture of the user for facial recognition) provides a way to ensure that only a person authorized to view rights-protected content (e.g. on the first CE device) is able to cause the content to be presented on a second CE device in accordance with present principles while still doing so relatively easily and seamlessly to the user of the first CE device. In this respect, the first CE device becomes a "gateway" for the user in that the first CE device may be networked and/or configured to access some or all of the user's (e.g. content) accounts, may be taken with the user wherever the user goes, and may be used to cause content to be presented on another CE device a single time in accordance with present principles.

In any case, and still in reference to FIG. 2, after block 104 the logic concludes at block 106 where the logic (e.g., automatically and/or without further user input in response to receiving the signal), provides one or more key(s) received at block 102 to the second CE device using close proximity communication.

It is to be understood that in addition to or in lieu of providing a key such as a private encryption key associated with a particular piece of content as described herein and despite keys being specifically referenced in other portions of the present application, it is to be understood that other data and/or information may be provided for seamlessly and/or automatically accessing rights-protected content at the second CE device without requiring a user to (e.g. manually) enter access information to the second CE device (e.g., rights protection information associated with the user or first CE device providing the key(s)) in accordance with present principles. Such information in addition to a key may be e.g. other content rights access information and authorization information other than e.g. login information to login or otherwise access a user's account with the content's provider on the second CE device. Further still, along with the keys or other authorization information, still other information may be provided therewith, such as e.g. location information of the location of the AV content (e.g. on a particular portion of a server if the content is to be streamed), threshold time(s) to be described further below, and/or the AV content itself.

In any case, it is to be understood that the key(s) and/or information provided at block 106 may be associated with a e.g. digital rights management (DRM) account for which the first CE device has been configured to access and/or the user of the first CE device is permitted to access. Furthermore, it is to be understood that the private key may be configured for a single use by any CE device as described herein to access the content, thereby permitting a user to e.g., present rights protected content owned and/or accessible to the user on a friend's device without having to enter access information to the friend's device to access the content, while still protecting the rights of the content provider in that the content cannot be freely presented at any time on any device with the key. Thus, it is to be understood that in example embodiments, when the key is transferred at block 106, e.g. account login information or other authentication information associated with a rights management account (e.g. associated with a user) that would otherwise be required to access the content from a content provider of the content is not required.

Furthermore, as indicated above, at block 106 the content itself may be provided by the first CE device undertaking the logic of FIG. 2 to the second CE device in addition to or in lieu of the second CE device accessing the content from e.g. a content server to thereby e.g. stream the content. Thus, for instance, the rights-protected content that is provided may be configured (e.g. by the content provider and/or by the CE device automatically without user input after what occurs at block 104 and before what occurs at block 106) for automatic presentation on the second CE device in response to the second CE device providing the private key upon its receipt to the content provider and receiving back from the content provider authorization information to present the content on the second CE device.

Moreover, note that in some exemplary embodiments, the private key may provide access to the content at the second CE device for only a predetermined amount of time from when the private key is provided/transferred to the second CE device at block 106 and/or from when presentation of the content is initiated at the second CE device, as will be described further below. Further still, it is to be understood that in some embodiments the first CE device undertaking the logic of FIG. 2 need not be connected to e.g. a local area network (LAN) to which the second CE device is connected in order to transfer data and content in accordance with present principles, instead communicating using a different close proximity communication (e.g. for direct communication) between the two CE devices, and thus providing yet another way a user's rights-protected content may be seamlessly and effortlessly viewed on e.g. a friend's (e.g. owing to the user not having to configure his or her own device to connect to the LAN in order to facilitate communication with the friend's CE device).

Notwithstanding the foregoing, it is to nonetheless be understood that e.g. a signal received at block 104 may but need not necessarily be a close proximity wireless transfer technology signal generated in response to the first and second CE devices physically contacting each other. A command to transfer that may be received at block 104 may instead or additionally be provided over the LAN should the devices be connected thereto. However, in instances where close proximity communication by physical contact is used, present principles recognize that the key and/or content itself may be provided to the second CE device while the devices are (e.g. still) in physical contact with each other using the close proximity wireless transfer technology after e.g. receiving the initial signal indicative of physical contact of the devices.

Figure 3:
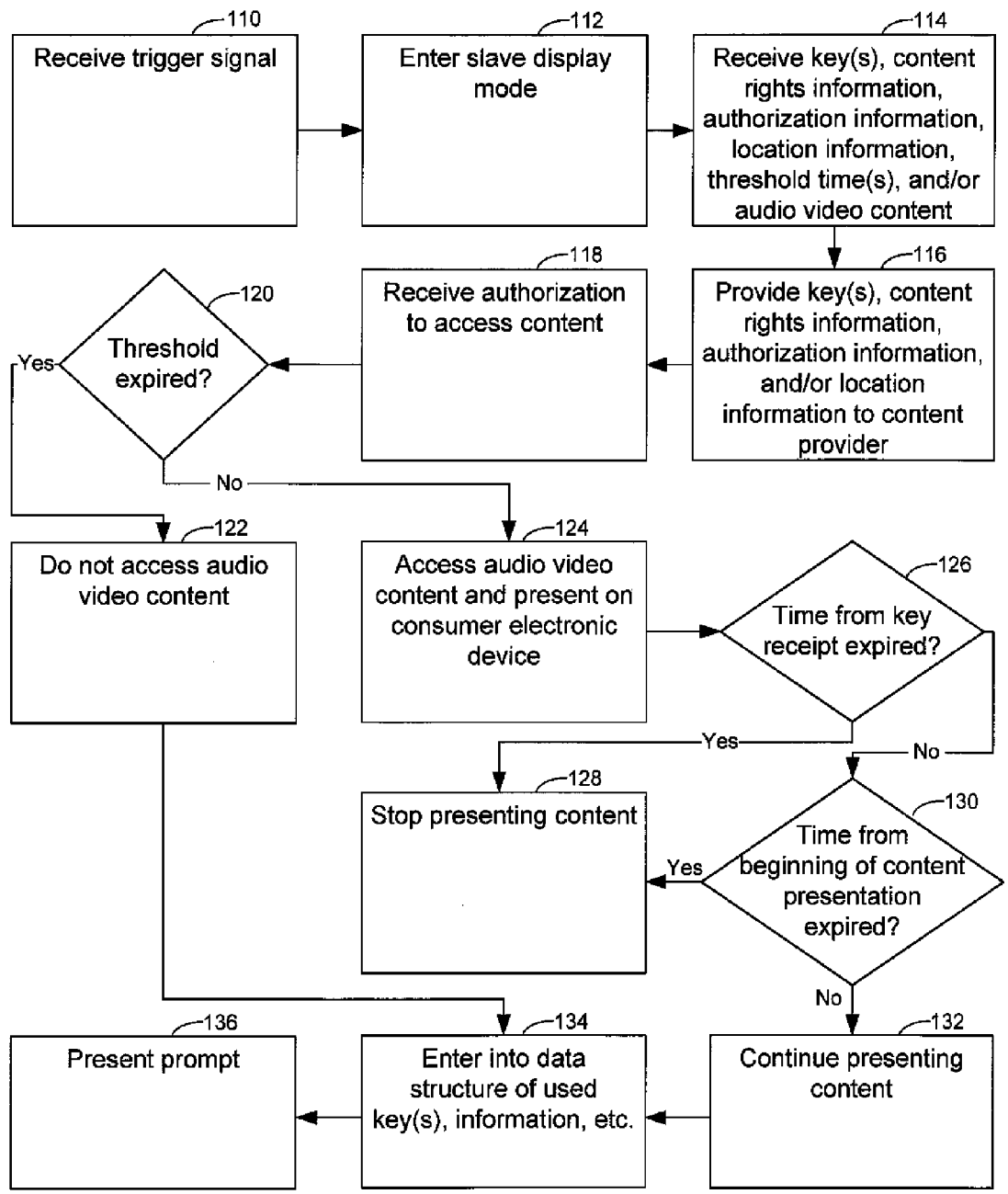

Continuing the detailed description in reference to FIG. 3, an example flowchart of logic to be executed by a CE device for receiving a key to access rights-protected content that has otherwise not been enabled for presentation on the CE device is shown, the CE device as referenced in FIG. 3 now being referred to as the first CE device. Beginning at block 110, the logic receives a signal that may trigger a change in display mode of the first CE device (e.g. to a slave or "dumb" display mode) to present content thereon that is otherwise is rights-protected. The trigger signal may be e.g. a signal generated based on physical contact with another device to thereby establish close-proximity wireless communication using e.g. TransferJet technology. At block 112, the first CE device (e.g., automatically without further user input responsive to the signal being received at block 110) may thus enter a slave display mode, "dumb" display mode, and/or a mode specifically configuring the CE device to a state or mode for transmitting a key to a content provider as described further below.

After block 112, the logic moves to block 114 where the logic receives e.g. a key (s) and/or other access information/authorization information other than e.g. login information to login or otherwise access a user's account with the content's provider in accordance with present principles (e.g. and as provided by a second CE device as described in reference to FIG. 2 above), as well as location information of the location of the content to be accessed, threshold time(s) to be described further below, and/or the content itself. It is to be understood that any or all of the key(s), data, and/or information received at block 114 may be configured for a single use to access the content in accordance with present principles.

From block 114 the logic proceeds to block 116, where the logic provides to the provider of the content which the first CE device seeks to access, and then the logic at block 118 receives back from the content provider authorization (e.g. and/or authorization information, location information, or any other information useful for accessing the content at the first CE device) to access the content (e.g. assuming the content provider does indeed authorize the first CE device to access the content and that e.g., the same key has not been previously used at a different time by the first CE device or another one to present the content, and thus comports with being a single-use key that has been previously unused in accordance with present principles).

Thereafter, the logic proceeds to decision diamond 120 where the logic determines whether a threshold time has expired from when authorization to access the content was received (e.g. to provide a time-based parameter for the rights-protected content to be presented on an "unauthorized" device and otherwise not being presentable thereon to thus prevent e.g. the "pirating" of the content onto the first CE device for presentation thereon at will). Note that the threshold time may have been indicated to the first CE device with the authorization to access the content at block 118 and/or attached as a condition to authorization such that the first CE device is unable to access the content from the content provider after expiration of the threshold time. If a positive determination is made at diamond 120, the logic proceeds to block 122 where the content is not accessed by the first CE device (e.g. prevented access by the content provider, determines not to access responsive to determining that the threshold time has expired, etc.). From block 122, the logic may then proceed to block 134, which will be described further below.

If, however, the logic makes a negative determination at diamond 120, the logic instead proceeds to block 124 where the logic accesses the content and presents it on the first CE device. Thereafter the logic proceeds to decision diamond 126 where the logic determines (e.g. while presenting the content) whether a threshold time from when the private key was provided to the first CE device has expired (e.g., the threshold time being established by the content provider). If the logic determines at diamond 126 that the threshold time has expired, the logic proceeds to block 128 where the logic ceases presenting the content on the first CE device. If the logic determines at diamond 126 that the threshold time has not expired, the logic instead proceeds to decision diamond 130 where the logic determines whether a threshold time has expired from when presentation of the AV content was initiated at the first CE device.

If the logic determines at diamond 128 that the threshold time has expired, the logic proceeds to block 128 where the logic ceases presenting the content on the first CE device. If the logic determines at diamond 128 that the threshold time has not expired, the logic instead proceeds to block 132 where the logic continues to present the content. Note that the determinations made at e.g. diamond 120, 126, and 128 thus provide a time-based restriction on how long after authorization or an access attempt the content can be viewed on the "unauthorized" first CE device.

Continuing still in reference to FIG. 3, after block 132 the logic proceeds to block 134 where the logic enters into a data structure/table e.g. stored locally on the first CE device the key that was used to access the content. This data structure/table may thus be used to make subsequent determinations at the first CE device regarding whether e.g. a key that was received has already been used and hence cannot be used again with the content provider for accessing the piece of content. Upon such a determination, the first CE device may e.g. provide a prompt to the user that the key is invalid or cannot be used to access the desired content, and the prompt may also indicate to the user that another key should be gathered.

In any case, the logic of FIG. 3 then moves from block 132 to block 134 where the logic present a prompt on the first CE device (e.g. after conclusion of presentation the content or during presentation) indicating that the content is available for purchase from the content provider. The prompt may also include e.g. a selector element selectable to automatically launch a content purchasing application to thus purchase the content for presentation on the first CE device (e.g. later), a selector element selectable to cause an account creation page to be presented on the first CE device for creating an account with the content provider for use to purchase content from the content provider, and/or a selector element selectable to cause a content purchasing application associated with the content provider to be automatically downloaded to the first CE device so that the application may then be used to purchase content (e.g. including the presented content) from the content provider.

Thus, as may be appreciated from the description of FIG. 3 and indeed in accordance with present principles, rights-protected content may be presented on a CE device receiving a key or other information as described above without the CE device providing any login information for an account with the content provider configured to permit access to the piece of content through the content provider. Put another way, the first CE device may be "unauthorized" in that it has not previously registered itself with the content provider (nor will it when accessing the content) as a device authorized to access a specific account to present the content in accordance with the DRM rights protection of the content, but may still present the content a single time anyway as described herein.

Figure 4:
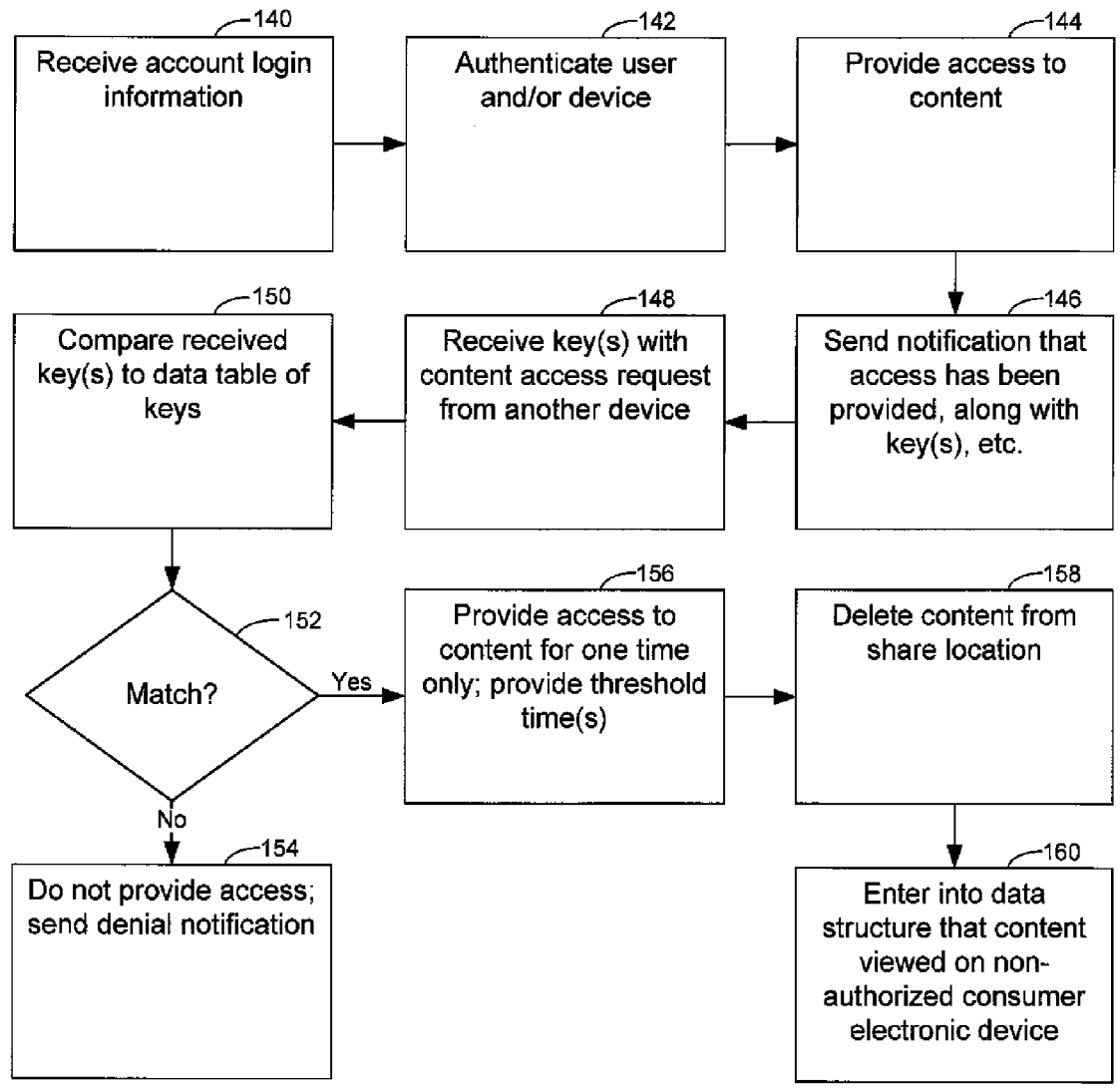
FIG. 4 is an exemplary flowchart of logic to be executed by a content provider and/or content-providing server in accordance with present principles.

Continuing the detailed description with reference to FIG. 4, exemplary logic to be executed by a content provider and/or server in accordance with present principles is shown. Beginning at block 140, the logic receives account access/login information from a first CE device (e.g. associated with a user account for accessing rights-protected content). Then at block 142 the logic authenticates the user and/or the first CE device from which the access information was received. Thereafter the logic moves to block 144 where the logic, assuming successful authentication, provides access to the content to the first CE device. The logic then proceeds to block 146 where the logic transmits a notification to the first CE device that access to content and/or the user's account with the content provider has been granted. Furthermore, at block 146 the logic may transmit to the first CE device e.g. a private key, location information, threshold information, etc. as described herein so that the first CE device may store such information and have it readily available when providing it to a second CE device in accordance with present principles.

The logic of FIG. 4 then continues to block 148 where the logic receives back the e.g. key, etc. from a second CE device (e.g. an "unauthorized" CE device) in accordance with present principles. Then at block 150 the logic compares the key(s) received at block 148 to a data table of keys and/or content rights information (e.g. associated with the particular piece of content to which the second CE device seeks access) previously generated and/or stored by the server/content provider. In one example, the logic may have entered the key(s) and/or information to the table at block 146 when the keys and information were provided to the first CE device. In addition to or in lieu of that, the logic may have entered the key(s) and/or information to the table prior to undertaking the logic of FIG. 4, and thus the data table may be accessed in order to determine the key(s) and/or information to provide to the first CE device at block 146. Regardless, it is to be understood that the table may be a table configured for storing information useful by the server/content provider for granting one-time access to the requested content to the second CE device upon determining at decision diamond 152 that the content rights information provided by the second CE device matches what is in the table.

Thus, if at diamond 152 the logic determines that the key(s) and/or information provided by the second CE device does not match what was previously stored in the data table, the logic proceeds to block 154 where the logic does not provide access to the content sought to be accessed by the second CE device and instead e.g. transmits a notification to the second CE device (e.g. that is visually presentable on the second CE device) indicating that access to the subject content has been denied. If, however, the logic determines at diamond 152 that the key provided by the second CE device does in fact match what was previously stored in the data table, the logic instead proceeds to block 156 where the logic provides and/or allows access to the requested content in accordance with present principles for e.g. a predetermined amount of time only.

Thus, for instance, should the second CE device stream the content from the content provider after being provided access, the content provider may only allow the content to be streamed for a certain (e.g. predetermined) amount of time to the "unauthorized" second CE device to prevent the rights-protected content from being presented on the second CE device at a later time when the first CE device and/or user of the first CE device is no longer present (e.g. relative to the second CE device) to observe the content that the person of the first CE device has been provided the rights to observe. In such a way, the user that the content provider recognizes as having permission to view the rights-protected content may observe the content on a device e.g. other than their own device such as their friend's device while also preventing their friend from viewing the content over and over again at a later time and without the person who has been granted permission to observe the rights-protected content.

Still in reference to FIG. 4, after block 156 the logic proceeds to block 158, where the logic may delete the content accessed by the second CE device from the location at which the second CE device accessed it, it being understood that the content provider/server may also have the same content stored elsewhere as well. It is to be understood that in addition to the foregoing, the location at which the streamed content was stored may be configured to automatically delete the content therefrom after streaming all or any part of the content therefrom. Deleting the content from the location at which the second CE device accessed it may thus prevent the second CE device from subsequent unauthorized access of the content at the location at which the content is stored. For example, the server at block 146 may have provided a (e.g. temporary) location at which the content will be stored to the first CE device for the purpose of being provided to the second CE device in accordance with present principles, and thus the second CE device is understood to receive location information for only the temporary location of the content.

After block 158, the logic concludes at block 160 where the logic e.g. enters data into a data structure (e.g. a data table) for later use for determining whether a key or other received information has already been used by an "unauthorized" CE device, thus ensuring that any given key is only used once by any "unauthorized" CE device. This may provide e.g. a way for the content provider to limit the number of instances that its rights-protected content is presented on an "unauthorized" CE device. Notwithstanding, note that in some embodiments the server may instead or additionally track the specific device providing the key and e.g. only deny subsequent access to that particular device while still providing access to other "unauthorized" devices providing the same key.

Figure 5:
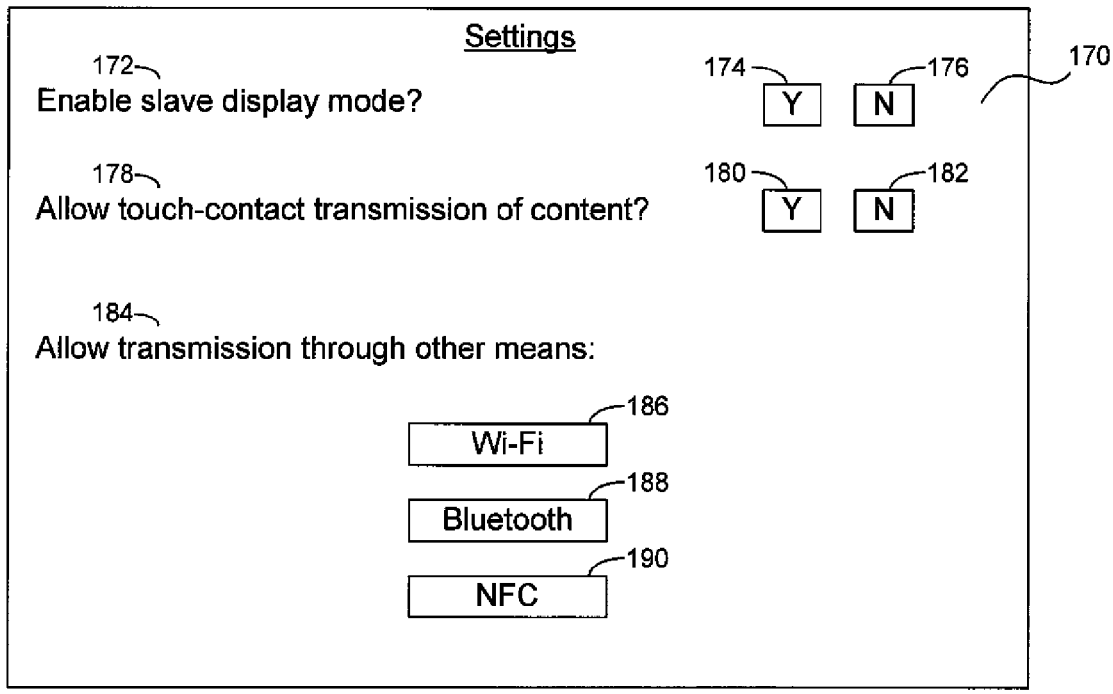
FIGS. 5-8 are exemplary user interfaces (UIs) presentable on a CE device in accordance with present principles.

Before moving on to FIG. 5, it is to be understood that the content provider and/or server may also use other techniques for preventing rights-protected content from being accessed by the second CE device even if the second CE device somehow acquires the single-use key. For instance, the content provider and/or server may be configured for communicating with the first CE device that provided the key to the second CE device. If the server determines, e.g. based on GPS coordinates from GPS transceivers on the first and second CE devices, that the first and second CE devices are not within an e.g. predefined maximum distance of each other, the content provider may not provide access to the content to the second CE device.

Also, note that should the second CE device receive the key from the first CE device but not attempt to access the content using the key, the second CE device may e.g. transmit a notification to the first CE device and/or content provider that they key was not used. The same key information may thus be provided by the first CE device to another CE device for a single-use by the other CE device despite being provided to the second CE device.

Even further, present principles recognize that the server and/or content provider may undertake one or more of the decisions of the logic of FIG. 3 as well. For instance, while streaming content to the second CE device, the server may make the determinations described in reference to diamonds 126 and 128 and stop streaming the content to the second CE device responsive to determinations that either or both of the threshold times have expired.

Now in reference to FIG. 5, an exemplary settings user interface (UI) 170 presentable on a CE device in accordance with present principles is shown. The UI 170 includes a first option 172 for enabling a slave display mode, along with a yes selector element 174 and a no selector element 176 for respectively selecting whether or not to enable e.g. the CE device to automatically change modes to a slave display mode as described above. The UI 170 also includes a second option 178 for allowing/enabling close proximity communication of content, keys, authorization information, etc. by physical contact of devices in accordance with present principles, and thus includes a yes selector element 180 for configuring the device for allowing/enabling such close proximity communication of content and a no selector element 182 for not doing so. In addition to the foregoing, the settings UI 170 may include a third option 184 for configuring the CE device for allowing/enabling close proximity communication of content using other communication protocols, such as e.g. Wi-Fi (by selecting the Wi-Fi selector element 186), Bluetooth (by selecting the Bluetooth selector element 188), and NFC (by selecting the NFC selector element 190). Note that one or more of the selector elements 180, 186, 188, and 190 may be selected at any given time.

Figure 6:
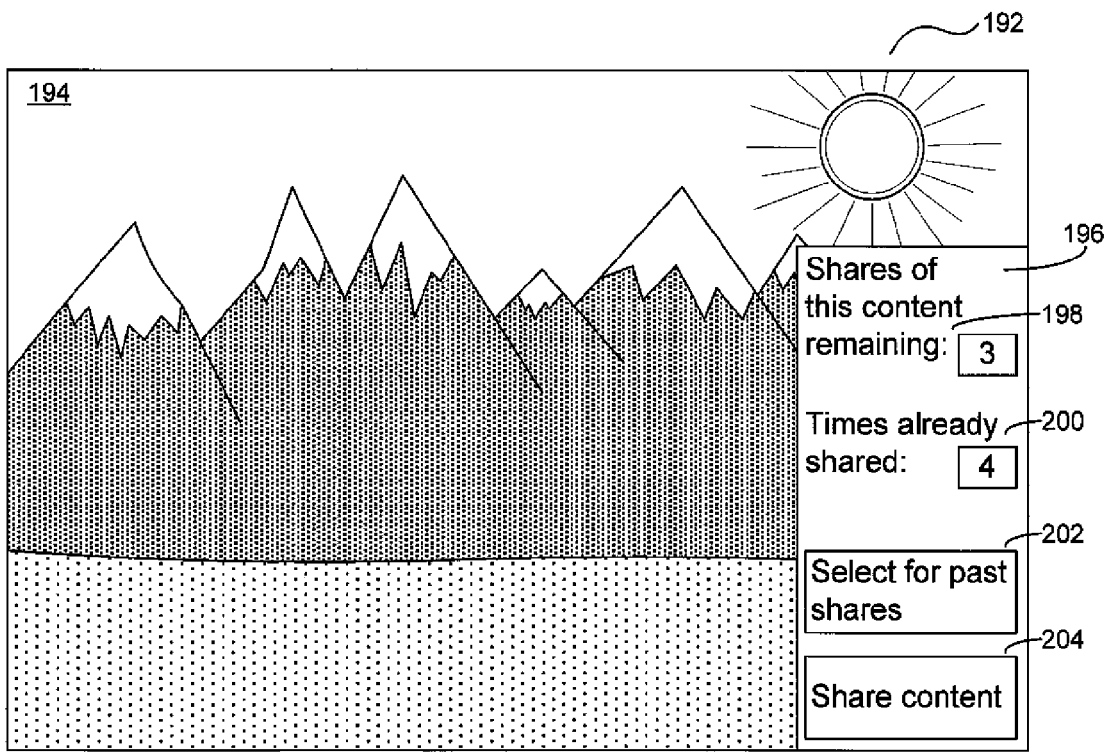

Now in reference to FIG. 6, an exemplary UI 192 is shown that is understood to be a UI presentable on a CE device that has been provided with permission to access rights-protected content e.g. by logging in to a content subscription service. The UI 192 thus includes video content 194 being presented thereon, along with an overlay portion 196 that may e.g. always be presented during presentation of the content or may be presented responsive to user input (e.g., the user taps the touch-enabled display screen while the content 194 is being presented, causing the portion 196 to automatically be presented responsive thereto). In any case, the portion 196 includes an indication 198 of the number of times/instances remaining that the particular piece of content may be shared/provided to other devices for one-time access in accordance with present principles.

The portion 196 also includes an indication 200 of the number of times that e.g. keys in accordance with present principles and pertaining to that particular piece of content 194 have been provided to "unauthorized" devices. Thus, it is to be understood that in some embodiments, a given content may be viewed by a user authorized to view the rights-protected content on any other single device only once, but may still view the content on more than one "unauthorized" device. The portion 196 may also include a selector element 202 selectable to cause a listing of past shares of the content and/or providing of keys to other devices in accordance with present principles, as well as a share content selector element 204 selectable to configure the CE device for e.g. transferring a key and/or location information to another CE device in accordance with present principles.

Figure 7:
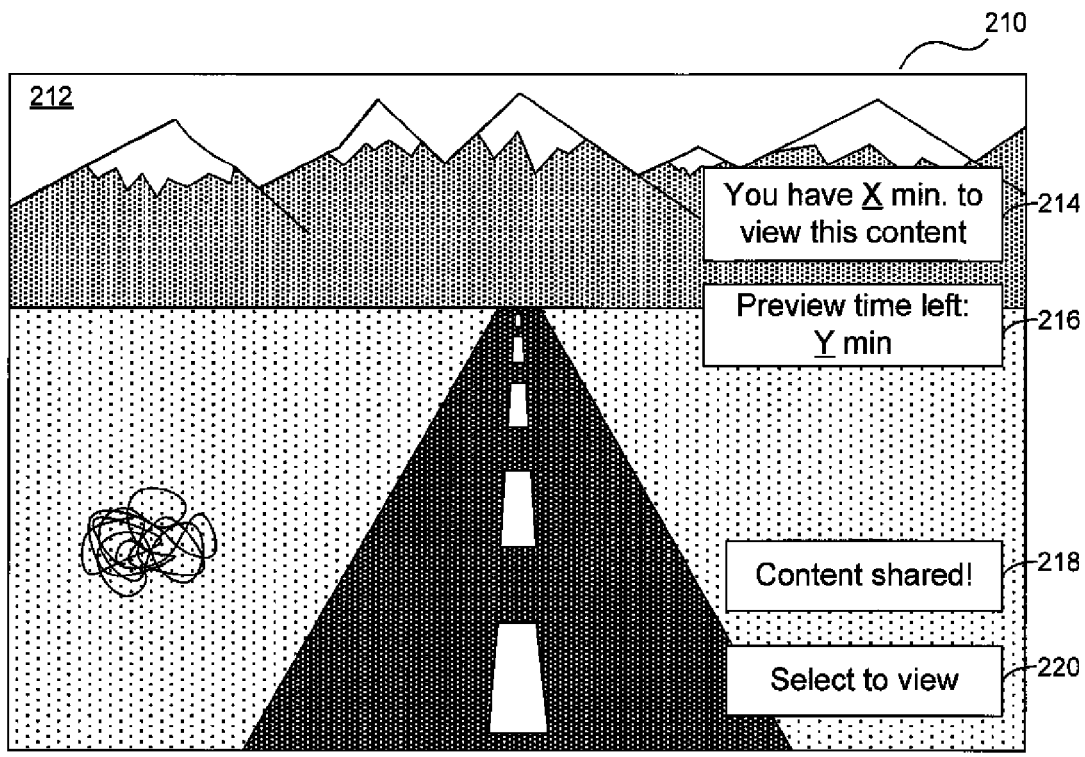

Moving on to FIG. 7, a UI 170 is shown that is understood to be a UI presentable on an "unauthorized" CE device that has been provided with a key to access what would otherwise be rights-protected content in accordance with present principles. The UI 210 includes video content 212 presented thereon. The UI 210 also includes an indication 214 of the time left that the CE device has been authorized to present the rights-protected content. Note that an indication 216 may also be provided if e.g. the content provider permits devices not having authorization to present the rights-protected content to nonetheless present a preview portion that is not so restricted. The indication 216 thus indicates how much more preview time remains for the content. Also included on the UI 210 is an indication 218 that content has been "shared" with the CE device, which may be presented e.g. responsive to the CE device receiving a key, location information, threshold information, etc. from another CE device for presenting rights-protected content in accordance with present principles. A selector element 220 is thus presented on the UI 210 that is selectable to automatically e.g. communicate the received key to the content provider to receive one-time access to the content in accordance with present principles. Note that the selector elements 218 and 220 may be associated with keys and content other than the video content 212 in some embodiments, and thus provide a notification that content other than what is currently being presented on the CE device has been made available.

Figure 8:
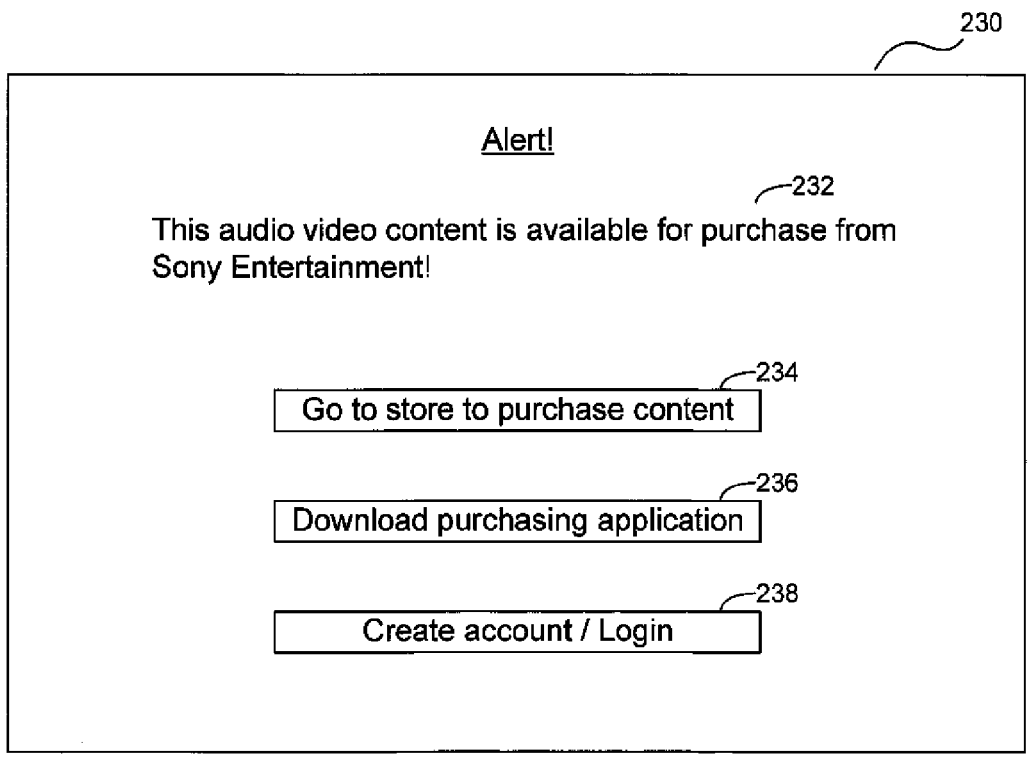

Moving on to FIG. 8, an exemplary prompt 230 is shown that may be presented after conclusion of presentation of the content (or during presentation) that was accessed using a single-use key in accordance with present principles. As may be appreciated from FIG. 8, the prompt 230 includes text 232 indicating that the content is available for purchase from the content provider. The prompt 230 also includes a selector element 234 that is selectable to cause the CE device to e.g. launch a content purchasing application or otherwise cause an electronic store to be presented on the CE device to then purchase the content from the store, as well as a download purchasing application selector element 236 that is selectable to cause the CE device to automatically download such a purchasing application if one is not already stored on the CE device. Thus, the selector element 236 may not be presented in some embodiments if the CE device determines prior to presenting the prompt that the purchasing application has already been downloaded to the device. Last, a create account and/or login selector element 238 is presented that is selectable to e.g. cause an account creation page to be presented for a user of the CE device to enter information to create an account with the content provider, and/or a login screen for logging in to an account that already exists.

Figure 9:
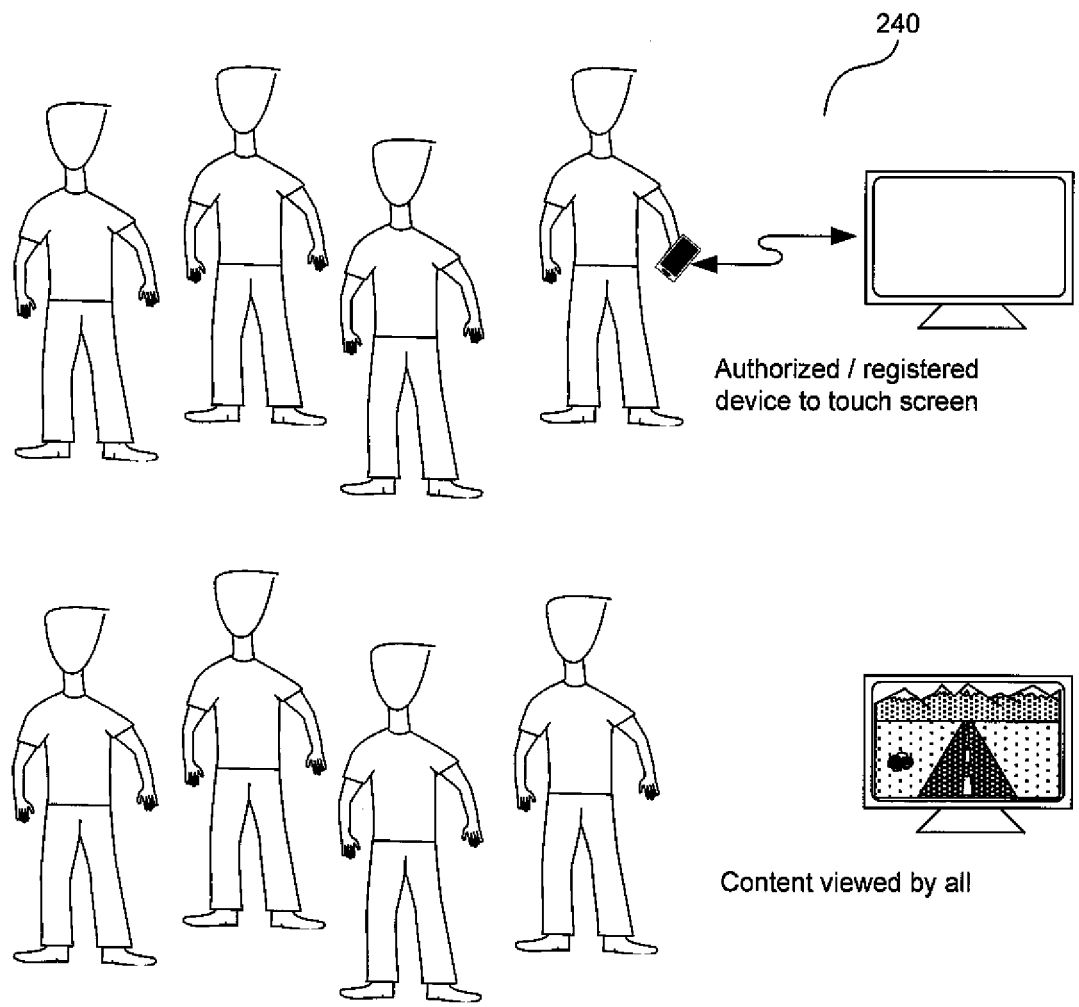
FIG. 9 is an exemplary illustration illustrating at least one aspect of present principles.

Continuing the detailed description in reference to FIG. 9, an exemplary illustration 240 is shown. The illustration shows first that a user authorized and/or registered to view rights-protected content causes his or her smartphone to come into physical contact with a television, which in turn may automatically cause a single-use key to be transferred to the television for presentation of a piece of rights-protected content in accordance with present principles. Thereafter, the content may be viewed on the television a single time by that user as well as any other individual present. Thus, an authorized/registered user may easily view content they have the rights to view on a device they do not e.g. own and/or frequently use.

Without reference to any particular figure, it may now be appreciated that devices, systems, and methods for enabling e.g. small audience viewing of rights-protected content while a person and/or device that has been authorized for viewing the content is present may be presented on another device not so authorized by receiving e.g. a key. This provides a means for presenting the content on another device without registering that device with the content provider and/or entering account access information for a subscription account to that device. Moreover, the device providing the key need not necessarily join or register itself to an unknown network in order to provide the key and may instead provide it using e.g. a close proximity communication as disclosed herein.

Notwithstanding, it is to be understood that in some instances the providing CE device may provide not just a key and the content itself (e.g. in a content file), but may also automatically transfer the content rights associated with the content to the other device. In such an instance, the providing device thereafter is no longer able to present the content because it has transferred its content-access rights to do so to the other device.

Also without reference to any particular figure, it is to be understood that e.g. when a person purchases content e.g. at least in part by manipulating the prompt of FIG. 8, the other device/user that provided the key may receive a purchasing credit from the content provider as a reward for e.g. providing the content to the other device for a single-use presentation that then resulted in a purchase of the content, thereby providing a way to e.g. monetize viral yet proprietary AV content. Present principles also recognize that e.g. if a user has the rights to view a high definition version of the content, keys and other information may be transferred to another device for only a standard definition or an otherwise lesser definition of the content to thereby motivate the user of the receiving device to purchase the content in a high definition format for optimal viewing, while still being able to view the standard definition version at least once.

Further, note that although present principles have been disclosed in terms of single-use keys and viewing of content on an "unauthorized" device, note that a content provider may configure the key and/or content (e.g. location) for viewing of the content a limited number of times more than a single time, if desired. Thus, the content provider may configure the key and/or content location to permit viewing of the content on an "unauthorized" device e.g. two or more times rather than one.

Additionally, note that content as disclosed herein is understood to not be limited to AV content even if content was referred to at various portions as "AV content," and may include contents such as e.g. audio-only content (e.g. music), video only content, still images, other data, etc. Along those lines, note that access may be similarly provided using present principles not just to rights-protected content but to e.g. rights-protected channels such as television channels. Thus, for instance, if a user has purchased the viewing rights to view a particular sports channel, the user may e.g. go to a friend's house, provide a key to the friend's TV in accordance with present principles, and then watch the sports channel on the friend's TV for e.g. a predefined period of time.

Last, present principles recognize that a key received at one CE device may e.g. for a predetermined period of time allow a user of that CE device you could browse through a content library/catalogue of the device that provided the key to determine e.g. which content may be desirable to share or even purchase for the receiving device.

While the particular AUTOMATICALLY PRESENTING RIGHTS PROTECTED CONTENT ON PREVIOUSLY UNAUTHORIZED DEVICE is herein shown and described in detail, it is to be understood that the subject matter which is encompassed by the present invention is limited only by the claims.

What is claimed is:

1. A first consumer electronics (CE) device comprising:
at least one computer memory that is not a transient signal and that comprises instructions executable by at least one processor for:
determining using first GPS location information from the first CE device and second GPS location information from a second CE device whether the first and second CE devices are within a predefined range of each other;
responsive to determining that the first and second CE devices are within the predefined range of each other, permitting the second CE device to access a first audio video (AV) content;
responsive to determining that the first and second CE devices are not within the predefined range of each other, not permitting the second CE device to access the first AV content;
pursuant to permitting the second CE device to access the first AV content sending to the second CE device information associated with a digital rights management (DRM) account for which the first CE device has been configured to access wherein the information provides access to the first AV content at the second CE device, the first AV content being associated with the DRM account of the first CE device;
presenting on at least one of the CE devices an indication of a number of times remaining that the first AV content may be shared/provided to other devices; and
presenting on the at least one of the CE devices an indication of a number of times that the first AV content has been provided to by the at least one of the CE devices to other devices.

2. The first CE device of claim 1, wherein the instructions are executable for providing, to the second CE device, location information for a first location at which the first AV content is stored.

3. The first CE device of claim 2, wherein the first location of the first AV content is at a server associated with the content provider, the first location configured for providing the first AV content only once from the first location to any single device.

4. The first CE device of claim 3, wherein the server for which the location information is provided is configured to delete the first AV content from the first location responsive to determining that the first AV content has been provided to any device, the first AV content also stored at a second location accessible to the first CE device using the DRM account.

5. The first CE device of claim 1, wherein the instructions are executable for providing, to the second CE device, the first AV content, wherein the first AV content is subject to at least one digital rights management protocol established by the content provider, and wherein the first AV content provided to the second CE device is configured for presentation on the second CE device in response to the second CE device providing the information to the content provider and receiving back from the content provider authorization to present the first AV content on the second CE device.

6. The first CE device of claim 1, wherein the information includes a private key that provides access to the first AV content at the second CE device for only a predetermined amount of time from when the private key is provided to the second CE device.

7. The first CE device of claim 6, wherein the private key is provided to the second CE device only upon authentication of a user of the first CE device at the first CE device as a person associated with the DRM account and authorized by the content provider to access the AV content, the authentication in part being executed based on facial recognition of the user and/or fingerprint recognition of the user.

8. The first CE device of claim 1, wherein the instructions are executable for:
determining whether a first threshold time from when the information was provided to the second CE device has expired;
responsive to a determination that the first threshold time has expired, not presenting the first AV content on the second CE device;
responsive to a determination that the first threshold time has not expired, determining whether a second threshold time has expired from when presentation of the first AV content was initiated at the second CE device;
responsive to a determination that the second threshold time has expired, not presenting the first AV content on the second CE device; and
responsive to a determination that the second threshold time has not expired, permit presenting the first AV content on the second CE device.

9. A computer readable storage medium that is not a transitory signal and comprising instructions executable by at least one processor of at least a server configured to communicate with at least a first consumer electronics (CE) device and at least a second CE device for:

receiving, from the first CE device, content rights information related to at least a first audio video (AV) content to permit play of the first AV content on the first CE device, the content rights information being useful with a content provider for accessing the first AV content from the content provider;

receiving a signal indicating that the first CE device seeks to share the first AV content with the second CE device;

determining using first GPS location information from the first CE device and second GPS location information from the second CE device whether the first and second CE devices are within a predefined range of each other;

responsive to determining that the first and second CE devices are within the predefined range of each other, permitting the second CE device to access the first AV content;

responsive to determining that the first and second CE devices are not within the predefined range of each other, not permitting the second CE device to access the first AV content;

determining whether a first threshold time from when the content rights information was provided to the second CE device has expired;

responsive to a determination that the first threshold time has expired, preventing presenting the first AV content on the second CE device;

responsive to a determination that the first threshold time has not expired, determining whether a second threshold time has expired from when presentation of the first AV content was initiated at the second CE device;

responsive to a determination that the second threshold time has expired, preventing presenting the first AV content on the second CE device; and responsive to a determination that the second threshold time has not expired, permit presenting the first AV content on the second CE device.

10. The computer readable storage medium of claim 9, wherein the content rights information does not include any login information for an account configured to permit access to the first AV content through the content provider.

11. The computer readable storage medium of claim 9, wherein communication received from the content provider is a communication provided from the content provider in response to the content provider comparing the content rights information provided by the first CE device against a table of content rights information for granting one-time access to the first AV content and determining that the content rights information provided by the first CE device is indicated on the table.

12. The computer readable storage medium of claim 11, wherein the content rights information is configured for use only once by any device for accessing the first AV content such that a subsequent providing of the content rights information to the content provider by any device does not result in the device being able to access the first AV content.

13. The first CE device of claim 9, wherein the content rights information is sent to the second CE device using a close proximity communication protocol selected from the group consisting of Wi-Fi, TransferJet, Bluetooth, and near field communication (NFC).

* * * * *